United States Patent [19]
Hanson

[11] Patent Number: 5,117,436
[45] Date of Patent: May 26, 1992

[54] OPTICS FOR DIODE ARRAY TRANSVERSE PUMPED LASER ROD

[75] Inventor: Frank Hanson, San Diego, Calif.

[73] Assignee: The United States of America as represented by the Secretary of the Navy, Washington, D.C.

[21] Appl. No.: 502,001

[22] Filed: Mar. 29, 1990

[51] Int. Cl.⁵ .............................. H01S 3/093
[52] U.S. Cl. ........................ 372/72; 372/70; 372/41; 372/75
[58] Field of Search .............. 372/70, 72, 75, 69, 372/41, 39, 66

[56] References Cited

U.S. PATENT DOCUMENTS

| | | | |
|---|---|---|---|
| 3,432,221 | 3/1969 | Harris et al. | 372/66 |
| 4,710,940 | 12/1987 | Sipes, Jr. | 372/75 |
| 4,725,787 | 2/1988 | Chandra | 330/4.3 |
| 4,734,912 | 3/1988 | Seerbak et al. | 372/27 |
| 4,756,002 | 7/1988 | Ruggieri et al. | 372/70 |
| 4,761,056 | 8/1988 | Byron | 350/96.15 |
| 4,785,459 | 11/1988 | Baer | 372/75 |
| 4,924,474 | 5/1990 | Yagi et al. | 372/75 |

OTHER PUBLICATIONS

Hanson et al., *Applied Opt.*, vol. 27(1) 1 Jan. 88 pp. 80–83 "Laser diode side pumping of neodymium laser rods".

*Primary Examiner*—Frank Gonzalez
*Assistant Examiner*—Galen J. Hansen
*Attorney, Agent, or Firm*—Harvey Fendelman; Thomas Glenn Keough

[57] ABSTRACT

A solid state laser rod of an anisotropic material is more efficiently side pumped by using cylindrical lenses and a half-wave plate with linear laser diode arrays disposed along the length of the solid state laser rod such that the polarization of the diode array light is rotated to achieve a maximum absorption coefficient in the laser rod material. In addition, Fresnel reflection losses at the lens and laser rod surfaces are reduced by a 90° polarization rotation.

5 Claims, 1 Drawing Sheet

OPTICS FOR DIODE ARRAY TRANSVERSE PUMPED LASER ROD

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

A series of innovations over the past few years has resulted in an increase in the efficiency and power of linear laser diode arrays. It has become feasible to use the linear laser diode arrays as optical pump sources for neodymium doped solid state laser materials. A usual configuration of the laser diode array is in a monolithic bar shape of many individual emitters that are connected electrically in parallel and are essentially incoherent. Each emitter may be many tens or hundreds of microns wide but only a few microns high, and therefore the emission diverges strongly in a plane perpendicular to the bar with a typical full-width half-maximum of about 30 degrees. The polarization is parallel to the active plane (and bar).

Referring to FIG. 1, demonstrations have shown that when a laser diode array DA is close coupled or butted next to a laser rod barrel provided with a reflective coating RC to give relatively good pumping efficiency, for example, over 30% optical slope efficiency (defined as the derivative of laser energy out with pump energy) for Nd:YAG. This phenomenon is discussed at length in the article by Frank Hanson et al. entitled "Laser Diode Side Pumping of Neodymium Laser Rod" Applied Optics, Vol. 27, No. 1, 1 Jan. 1988. There is evidence to suggest that cylindrical focusing optics have been used to help collect more pump light and to image the array output inside of the laser rod.

Thus a continuing need exists in the state of the art for an improvement for a solid state laser rod pumped by linear laser diode arrays which increases the efficiency of such arrangements.

SUMMARY OF THE INVENTION

The present invention is directed to providing an improvement for a solid state laser. A solid state laser rod is more efficiently side-pumped by using cylindrical lenses and a half-wave plate interposed between the rod and a linear laser array. The solid angle of light collected from the diode arrays is increased and the Fresnel reflection losses at the lens and the laser rod surfaces are reduced.

An object of the invention is to increase the efficiency of a rod laser.

Another object is to increase the output of a solid state laser rod that is side-pumped by a linear laser diode array.

Another object is to provide an increased output for a solid state laser rod pumped by a linear laser diode array having a half-wave plate interposed between the rod and array.

Another object is to provide an increased output for a solid state laser rod side-pumped by a linear laser diode array including a cylindrical linear lens arrangement and a half-wave plate interposed between the rod and array.

These and other objects of the invention will become more readily apparent from the ensuing specification when taken in conjunction with the drawings and appended claims.

DESCRIPTION OF THE PREFERRED EMBODIMENT

Figure 1:
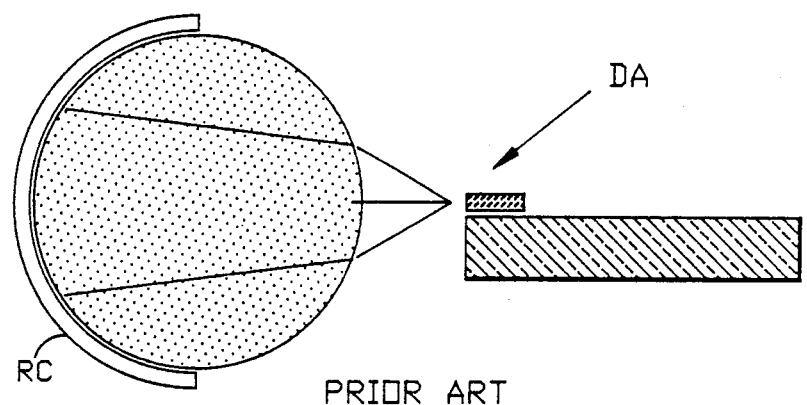
FIG. 1 shows a prior art cross-sectional representation of the pumping geometry associated with a linear diode array being simply close-coupled to a laser rod.
Figure 2:
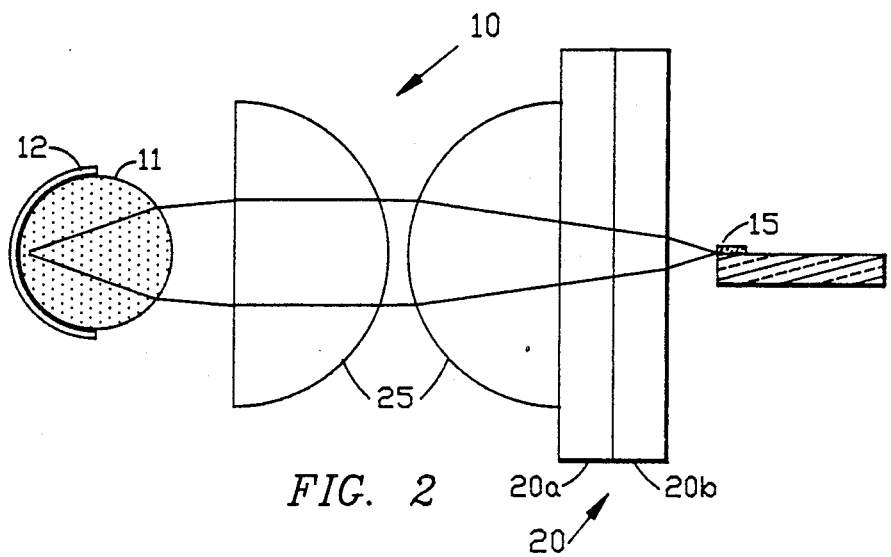
FIG. 2 is a cross-sectional depiction of the inventive concept having a pumping geometry using a first-order half-wave plate to rotate the S-polarized linear diode array emission to P-polarized and two cylindrical lenses to collect and focus the light into the laser rod.
Figure 3:
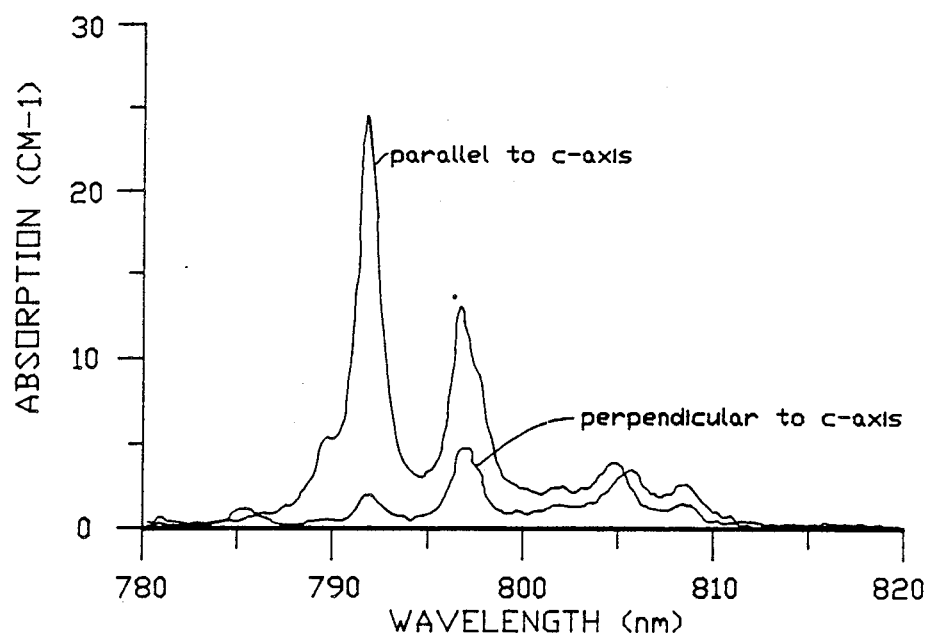
FIG. 3 is a representative depiction of the absorption spectrum for Nd:YLF, E-polarized parallel to the c-axis (top trace) and E-polarized perpendicular to the c-axis (bottom trace).

Referring now to FIG. 2, an improved side pump laser head 10 includes an elongate laser rod 11 that could be fabricated from isotropic or anisotropic laser crystals. The rod is provided with a reflective coating or backing 12 that is longitudinally disposed in a contiguously adjacent relationship to define an arcuate surface projection along the length of the elongate laser rod. An elongate linear laser diode array 15, coextensively extending along the rod, is located a short distance from the rod to function as a pump. An elongate first-order half-wave plate 20 is appropriately designed to properly accommodate the pump wavelength and is located immediately in front of the linear laser diode array 15 and oriented with its optic axis at 45 degrees with respect to the plane of the array. A first-order wave plate is preferable to a multi-order wave plate because it maintains a more constant retardation over a larger range of angles and wavelengths.

At this point mention should be made that the reference to the term elongate is herein intended to be for the purposes of demonstration of the fact that the identified members coextend with respect to one another. It is to be understood that the relative shapes of the named members can be other than linear such as to include different configurations that may accommodate differently shaped ones of the identified members and/or different operating parameters. For example, the laser material actually could be slab-shaped, rectangular cross-sectional configuration and the diode array could be appropriately configured to suitably pump it.

The light from the linear diode array is polarized in the plane of the array, parallel to the axis of the rod. This is often not optimum for maximizing the absorption of pump light from the diode in the laser rod. After traveling through a first-order wave plate half 20, the polarization of the pump light is rotated by 90° and is parallel to the plane of incidence (P-polarization) i.e. perpendicular to the plane of the array. The half-wavelength plate is used to rotate the polarization from S to P which lessens the Fresnel reflection at all of the optical interfaces.

One or two cylindrical lenses 25 are aligned parallel to the axis of laser rod 11 and are disposed to contiguously extend between half-wave plate 20 and laser rod 11 to collimate and focus the light into the laser rod 11. The distance from the lenses to the rod is adjusted to optimize the pump focus at the center of the laser rod and, as a consequence, increase the resulting laser output.

For noncoated optical surfaces at other than normal incidence, the reflection coefficient is always larger for light polarized out of the plane of incidence (S-polarized) than it is when parallel to the plane of incidence (P-polarized). As an example, for 0.8 micron light in Nd:YAG (n=1.82) incident at 30 degrees to the normal, the S reflection coefficient is about 11.4% compared to 5.9% for the P reflection coefficient. All of the surfaces of the laser rod, the lenses and the half-wave plate can be antireflection coated to reduce this loss; however, these coatings are designed for a particular angle of incidence and are less perfect at other angles. Such coated surfaces still generally transmit the P polarization better.

The primary benefit of the half-wave plate becomes apparent when anisotropic laser materials are pumped. For an isotropic material such as Nd:YAG, the absorption is independent of polarization; however, for other anisotropic materials such as Nd:YLF or Nd:YALO the absorption and emission can be strongly dependent on polarization.

For example, the stimulated emission cross section for Nd:YLF at 1 micron is significantly stronger for light polarized parallel to the c-axis($\pi$) so that it is desirable that the c-axis be perpendicular to the laser rod axis. If no wave plate is used in the pump geometry shown in FIG. 2, the absorption would then be $\sigma$ which is much weaker than $\pi$. This comparison is apparent when noting the differences between the absorptions over various wavelengths when the E vector is polarized parallel to the c-axis as compared to when the E vector is polarized perpendicular to the c-axis. The half-wave plate allows operation with both the strong $\pi$ emission and the much stronger $\pi$ absorption.

A standard first-order wave plate 20 consists of two optically cemented multi-order plates 20a and 20b that together are typically about 2 mm thick. Inserting the half-wave plate between laser diode array 15 and laser rod 11, therefore, requires that the distance from the rod to the array be further increased. As a consequence, the addition of the cylindrical lenses becomes more important for the purposes of collecting and refocusing the pump light into the rod.

The elongate laser rod and elongate laser diode array having the interposed half-wave plate and lenses thusly described is an uncomplicated and reliable means to achieve P-polarization. Optionally, polarization rotators based on optical rotary effects could be used. Use of such rotators, however, would require larger focusing lenses since the polarization rotators usually are much thicker.

Obviously, many modifications and variations of the present inventions are possible in the light of the above teachings. It is therefore to be understood that within the scope of the appended claims the invention may be practiced otherwise than specifically described.

I claim:

1. An improvement for the pumping efficiency of a laser comprising:
   an elongate laser rod of an anisotropic material
   a reflective coating longitudinally disposed and contiguously adjacent an arcuate surface projection along said elongate laser rod;
   an elongate laser diode array longitudinally disposed parallel to said elongate laser rod and spaced apart therefrom;
   an elongate half-wave plate interposed between said elongate laser rod and said elongate laser diode array being oriented with its optic axis at 45 degrees with respect to the plane of said elongate laser diode array for rotating the linear polarization of the light from said elongate laser diode array by 90° such that Fresnel reflections are reduced and that an increased absorption coefficient for diode light in said anisotropic material is realized; and
   at least one lens disposed between said elongate half-wave plate and said elongate laser rod to collimate and focus the light emanating from said elongate laser diode array into said elongate laser rod.

2. The improvement to the laser according to claim 1 in which there are provided a pair of cylindrical lenses to effect the collimation and focusing of the emanated light from said elongate laser diode array into said elongate laser rod.

3. The apparatus improvement to the laser according to claim 2 in which said lenses are spaced appropriately from said elongate laser rod to optimize the focus of the pump at the center of said elongate laser rod thereby increasing the resulting laser output.

4. The improvement to the laser according to claim 3 in which said elongate laser rod is fabricated from Nd:YLF laser crystals.

5. The improvement to the laser according to claim 3 in which said elongate laser rod is fabricated from Nd:YALO laser crystals.

* * * * *